United States Patent Office 3,706,732
Patented Dec. 19, 1972

3,706,732
POLYFRUCTOSAN TRINICOTINATES
Karl Holzer, Linz (Danube), Austria, assignor to Laevosan-Gesellschaft Chem. Pharm. Industrie Frank & Dr. Freudl, Linz (Danube), Austria
No Drawing. Filed Feb. 9, 1970, Ser. No. 9,977
Int. Cl. C07c 47/18
U.S. Cl. 260—234 R                    2 Claims

ABSTRACT OF THE DISCLOSURE

Polyfructosan trinicotinates are disclosed wherein the polyfructosan is inulin, sinistrin or garlic polyfructosan. These materials may be prepared by esterifying nicotinic acid or a derivative thereof with the corresponding fructosan in the presence of an acid bonding agent and in the presence of inert solvents. The resulting polyfructosan trinicotinates have pharmacological activity and slowly release nicotinic acid in the body.

FIELD OF THE INVENTION

The present invention refers to a method of preparing new nicotinic acid esters of pharmacological activity.

DESCRIPTION OF THE PRIOR ART

Nicotinic acid and its compounds, salts and esters all exhibit a pronounced biological activity. Nicotinic acid itself when administered orally or injected effects a strong dilation of the skin tissue, particularly in the region of the head, neck, upper limbs and the trunk. Upon intravenous injection, fibrinolysis of the blood is activated by nicotinic acid and a decrease in the cholesterol level of the serum produced. The same effects occur in principle upon oral administration of nicotinic acid and its derivatives. The absorption of nicotinic acid from the gastrointestinal tract takes place rapidly and completely.

Nicotinamide, a vitamin of the B group, is also a precursor of coenzymes and participates in a number of metabolic processes.

Upon the administration of nicotinic acid and some of its compounds, undesired side phenomena frequently take place as a result of rapid absorption (reddening of the skin and itching, particularly in the face). It has been and is therefore constantly sought to produce compounds of nicotinic acid which more slowly split in the body so that the nicotinic acid liberated cannot be absorbed so rapidly that these side effects take place.

One of these compounds is a nicotinic acid/fructose compound, tetranicotinyl fructose. This compound actually resulted in a lengthening of the absorption time. However, it is desirable to create compounds in connection with which the lengthening of the absorption time is even more pronounced. It thereby becomes possible to supply therapeutically sufficiently high doses of nicotinic acid without having to tolerate the above-indicated side phenomena.

The action of the substance should commence rapidly and therefore the splitting of the ester take place soon after administration and maintain as uniform as possible a value for a long time. The desired goal can be reached by using as alcoholic component of the ester, instead of fructose, polyfructosans, in particular from compositae, liliaceae, such as garlic polyfucrtosan and polyfructosan from the Hawaiian ti-plant (*Cordyline terminalis*) and gramineae, such as inulin or sinistrin.

SUMMARY OF THE INVENTION

It is one object of the present invention to provide a method of producing new nicotinic acid esters which consists in esterifying nicotinic acid, preferably in the form of suitable derivatives, such as halides, anhydride or the like, in the presence of acid bonding agents, such as tertiary bases, for instance pyridine, possibly in the presence of inert solvents, such as chloroform or the like, with polyfructosans. In this connection, per each fructose unit of the polyfructosan, one to three nicotinic acid radicals can be reacted; in most cases it will be advisable in order to prepare a preparation having optimum effect to prepare the polyfructosan trinicotinate; as polyfructosan components, inulin, sinistrin and garlic polyfructosan have in particular proven satisfactory, but polyfructosans of other origin can also be used in the method of the invention.

DESCRIPTION OF PREFERRED EMBODIMENT

The following examples will serve further to explain the object of the present invention, without the invention, however, being limited to them.

Example 1

32.4 g. of finely ground, dried inulin are suspended in 150 ml. of dry pyridine and treated while stirring gradually with 100 ml. of nicotinoyl chloride. At the start the temperature should not go above 40° C., in order to avoid a baking together of the inulin. After addition of about two-thirds of the chloride, the reaction is started by heating until the mixture is heated further by a spontaneous development of heat and becomes clear. After the addition of the rest of the chloride, the dark brown batch is heated for a further hour up to close to the boiling point and finally allowed to cool. Decomposition is effected with a small amount of ice and water and the resin which precipitates is treated with water until it decomposes into the form of a powder; the powder is removed by suction filtration, washed with water and dried in vacuum at 40° C. Yield is about 95 g. crude product. For purification it is dissolved in methanol, filtered with carbon and precipitated with water. The weight of the product after being dried as above was about 90 g. Inulin trinicotinate prepared in this manner forms a light ocher yellow, amorphous, odorless and tasteless powder. It is insoluble in water, ether and petroleum ether, and soluble in dilute acids, in alcohol and chloroform. The melting range is 117–130° C. The specific rotation in methanol was found to be —53.6° (c.=10, 20°, Na line). Titration with anhydrous perchloric acid gave 99% esterification with nicotinic acid.

Example 2

From 34.7 g. of finely pulverized, dry polyfructosan from garlic in 150 ml. dry pyridine and 100 ml. nicotinoyl chloride, 96.6 g. of graying brown crude product are obtained by the method described in Example 1. By purification in the manner described in Example 1 there are obtained 91.5 g. of a light grayish-brown powder having solubility properties such as described in connection with inulin nicotinate. The melting range is 129–138° C. The specific rotation in methanol is found to be —57.8° (c.=10, 20°, Na line). Perchloric acid titration showed 96.7% esterification with nicotinic acid.

Example 3

8.6 g. of powdered, dry polyfructosan from the Hawaiian ti-plant in 40 ml. of dry pyridine and 27 ml. of nicotinoyl chloride gave, by the method described in Example 1, 23, 7 g. of light grayish-brown raw nicotinate. Upon purification in the manner described in Example 1, 22.3 g. of light ocher yellow final product are obtained. The preparation has the solubility properties of inulin nicotinate; its melting range is 125–130° C. The specific rotation is —54.8° (c.=10, methanol 20%, Na line) and perchloric acid titration showed 97.6% esterification with nicotinic acid.

While I have disclosed several embodiments of the present invention, it is to be understood that these embodiments are given by example only and not in a limiting sense.

I claim:
1. Polyfructosan trinicotinate.
2. The polyfructosan trinicotinate of claim 1 wherein the polyfructosan is inulin, sinistrin or garlic polyfructosan.

References Cited
UNITED STATES PATENTS
3,272,832  9/1966  Nakano et al. _____ 260—295.5

LEWIS GOTTS, Primary Examiner
J. R. BROWN, Assistant Examiner

U.S. Cl. X.R.
260—999